United States Patent [19]

Beals

[11] Patent Number: 4,583,093
[45] Date of Patent: Apr. 15, 1986

[54] TELEMETRY DRIVING CIRCUIT

[75] Inventor: Richard A. Beals, Houston, Tex.

[73] Assignee: Halliburton Company, Duncan, Okla.

[21] Appl. No.: 523,553

[22] Filed: Aug. 16, 1983

[51] Int. Cl.$^4$ ............... G01V 1/00; E21B 29/02
[52] U.S. Cl. ................................. 340/857; 166/65.1
[58] Field of Search ........... 340/856, 857, 853, 858, 340/859; 181/102; 367/25, 81, 191, 911, 912; 166/65 R; 324/323; 307/200 B

[56] References Cited

U.S. PATENT DOCUMENTS 3,952,282  4/1976  Zemanek, Jr. ............... 181/102 X
4,293,934 10/1981  Herolz et al. ................ 367/911 X Primary Examiner—Charles T. Jordan
Assistant Examiner—Brian S. Steinberger
Attorney, Agent, or Firm—W. J. Beard

[57] ABSTRACT

For use with a down hole logging system equipped with a logging cable having two wires therein, the preferred and illustrated embodiment sets forth a system which conducts electrical power and telemetry signals along a two wire logging cable. AC power is generated at the surface for transmission to a power consuming load in the sonde. This AC supply has a specified frequency, there also being data gathering equipment in the sonde which forms an AC telemetry signal transmitted up the two wire logging cable. This disclosure is directed to an improvement in the telemetry drive circuitry which maintains the isolation between power flow and signal flow. The circuitry incorporates FET output transistors, transformer coupled, to provide the necessary output signal and isolation.

9 Claims, 3 Drawing Figures

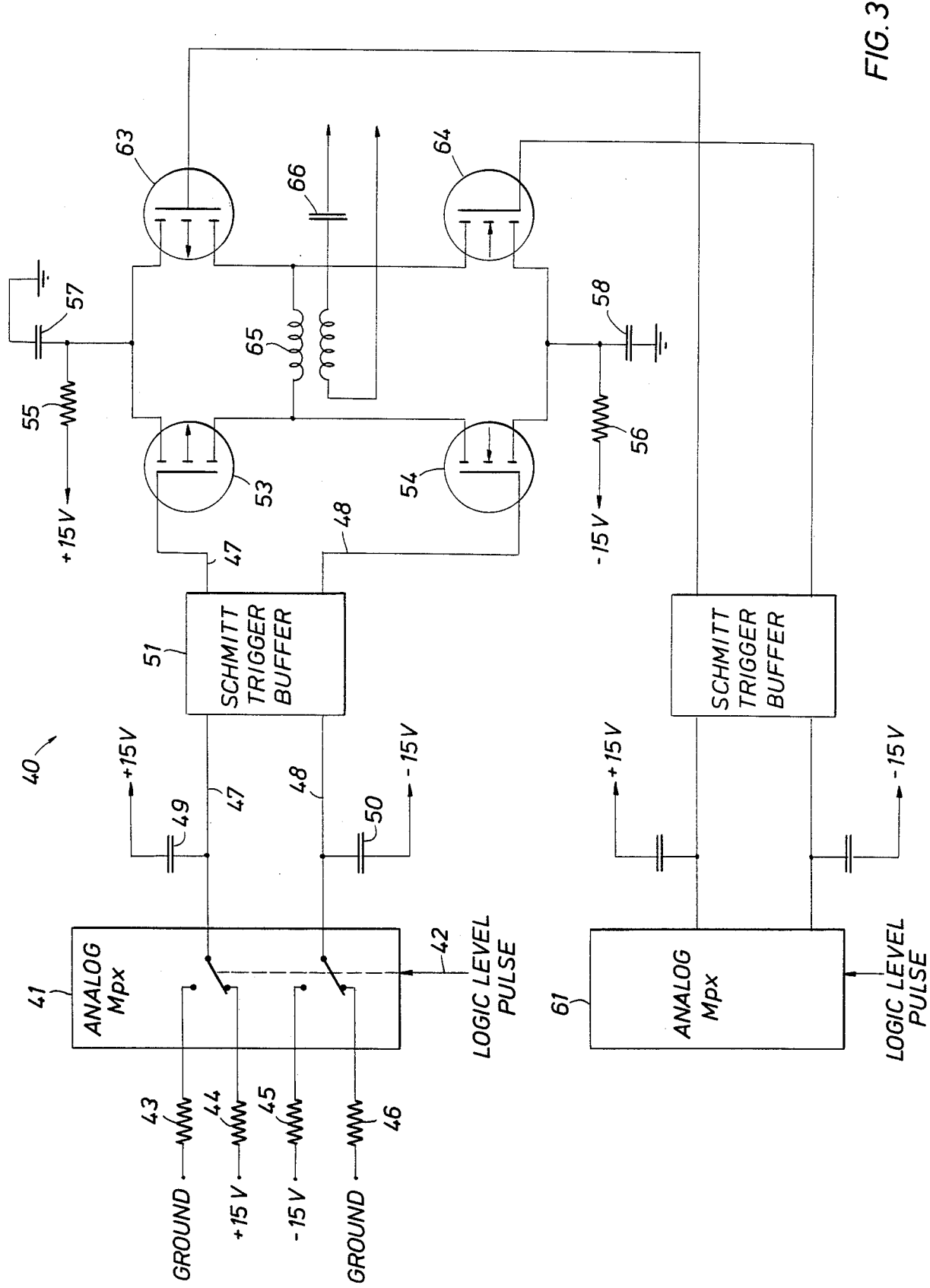

TELEMETRY DRIVING CIRCUIT

BACKGROUND OF THE DISCLOSURE

Consider the method of providing power and signal flow to and from a sonde supported in a well bore on a logging cable. A logging cable having only two wires is known as a monocable. In the typical arrangement, it not only physically supports the sonde to be raised or lowered in the well, but it also provides two wire transmission for power and signal. Power is transmitted from a power source at the wellhead to a power load in the sonde. The power load is a device which consumes power while also forming an output signal from the operation of the logging devices within the sonde. The precise nature of the logging device is not particularly critical. An example is logging equipment which provides SP measurements which are relayed up to the surface. The data is supplied to data conversion circuitry which terminates in a telemetry transmitter to enable the data to be transferred up the logging cable. The two wire monocable must therefore transmit power from the power source at the wellhead along the cable and must also transmit the data of interest along the cable.

Customarily, power is furnished at 400 hertz. This enables the use of transformers to provide various voltages in the sonde. Equally, AC power is preferable over DC power because there is a risk of magnetizing the spooled cable on the storage reel supported on the logging truck at the surface. Moreover, the use of AC power enables filters to isolate the telemetry signal because it is ordinarily transmitted at a frequency and bandwidth enabling separation from the power transmission equipment.

While not all wells are extremely deep, it is not uncommon for a well to be over 20,000 feet deep. Obviously, the logging cable must exceed the length of the well. Logging cables are as long as 25,000 or 30,000 feet. A fairly substantial driving signal from the telemetry transmitter carried in the sonde is required to transmit a data pulse through the long monocable. Perhaps the difficulty of such data transmission is better understood by reviewing the typical circuit presently in use. As will be noted with regard to FIG. 2 of the drawings herein, a blocking capacitor 30 in the sonde isolates the AC power intended for the power load from the telemetry driver circuitry. FIG. 2 further incorporates a series inductance 31 cooperating with a series capacitor 32 for furnishing power to the power load. This passes the AC supply power and blocks the high frequency telemetry signal. As will be observed in FIG. 2, the quiescent state finds the telemetry driver transistors 33 and 34 non-conducting, and the transistor resistor 35 is transformer coupled through the transformer 36 into the circuit in series with the capacitor 30. In this quiescent condition, the supply frequency is imposed across the transformer 36 in an amount depending upon the ratio of capacitor 30 impedance and the transformed impedance of resistor 35. There is a minimum value of resistor 35 for this circuit because, when one of the transistors 33 or 34 begins to conduct, the resistor 35 causes a current to be drawn through the output transformer 36 in a bucking direction. For example, if the resistor 35 were zero ohms, then there would be no output signal developed due to opposite currents in the two halves of the primary. However, if resistor 35 is large, then the voltage across the transformer will cause the telemetry pulses to be amplitude modulated, thus the circuit causes a compromise in design parameters which results in less than optimum telemetry transfer characteristics. This occurs because the quiescent voltage across transformer 36 causes the output pulse to be amplitude modulated.

The present invention offers an improvement over the foregoing. The low impedance output in the quiescent state means that the output pulses from the multiplexed data signal are not peak amplitude modulated. Rather, the isolation which is achieved enables the apparatus to successfully telemeter the more sensitive data signal on the monocable without pulse amplitude modulation or other undesired effects of shared transmission along the monocable.

An additional advantage of the present apparatus is that a low impedance at the output simplifies power filtering. The low impedance helps to shunt high frequency components which may be generated by the power supply to ground. The circuitry also utilizes less power. Moreover, the output stage of the apparatus of the present invention does not exhibit thermal runaway characteristics at elevated temperatures. These advantages and features will be more readily applied upon a review of the detailed disclosure set forth below. Briefly, this apparatus is directed to a telemetry driver stage for use on a monocable where the cable shares AC power transmission.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 shows the improved FET telemetry driver circuit of the present disclosure and in particular sets forth the cooperation of the circuit with the input circuitry to enable transmission of the metered signal on the monocable.

DETAILED DESCRIPTION OF THE PREFERRED EMBODIMENT

Figure 1:
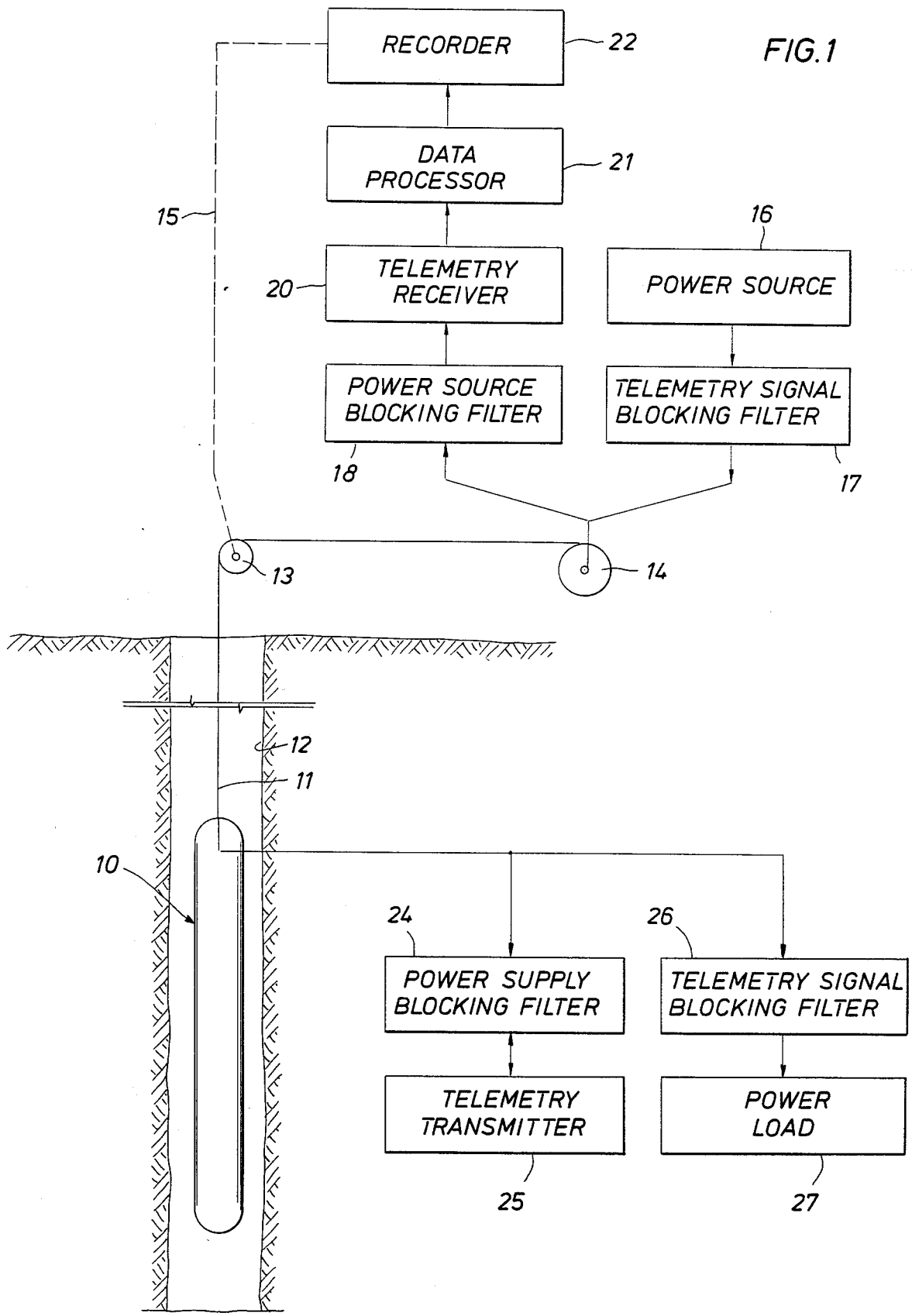
FIG. 1 discloses a logging tool in a well bore hole, the tool being equipped with a monocable conducting power for the sonde and also the telemetered data signal from the sonde.

A sonde 10 is shown in a bore hole 12 on a monocable 11. The particular logging equipment in the sonde 10 can vary; an example is the SP measurement transmitted along the monocable 11. The monocable 11 passes over a shive 13 at the wellhead. The cable 11 is spooled on a supply reel 14 typically mounted on a logging truck. The reel 14 supplies the requisite length of cable for operation of the sonde 10 at selected depths in the bore hole. Typically, the sonde 10 is lowered to the bottom as a preliminary step and then in retrieved by respooling the monocable 11 onto the reel 14.

The sheave 13 is electrically or mechanically monitored as it rotates by means of a depth measuring system 15 which inputs the signal into a recorder to be described. The monocable 14 has two conductors. They are connected at the surface as will be described to handle both the power required for operation and the telemetry signal. At the surface, there is a power source 16. A typical power source may furnish power at 60 hertz at a suitable current level, typically several amperes. This is supplied through a telemetry signal blocking filter 17 and is input to the monocable 14. The surface located equipment also includes a power source blocking filter 18 which is connected to the monocable 14. This passes the data of interest but blocks the power. The filters 17 and 18 are frequency sensitive filters. Typically, the telemetry signal is at a relatively high frequency compared to the frequency of the power supply from the power source 16. The signal of interest is therefore passed through the filter 18 and is supplied to a telemetry receiver 20. The receiver 20 converts the signal for a data processor 21 which is in turn connected with a recorder 22. The recorder 22 records logging signals such as the SP measurement as a function of depth of the sonde in the well bore.

The sonde 10 encloses equipment for its operation. The monocable 11 is thus connected to a power supply blocking filter 24. That in turn is connected with a telemetry transmitter 25. The telemetry transmitter 25 furnishes a telemetry signal to the filter 24 to enable the signal to be imposed on the monocable 11. Similar to the surface equipment, there is a telemetry blocking filter 26 connected to the monocable. This filter is also connected to the power load 27. The power load 27 is furnished with AC power. The filter 26 blocks the high frequency AC component received from the monocable, thereby enabling the AC power to be delivered to the load. The filter 26 blocks the higher frequency signal. By contrast, AC power is not delivered through the filter 24; rather, the filter 24 enables the telemetry signal to be coupled into the monocable.

Figure 2:
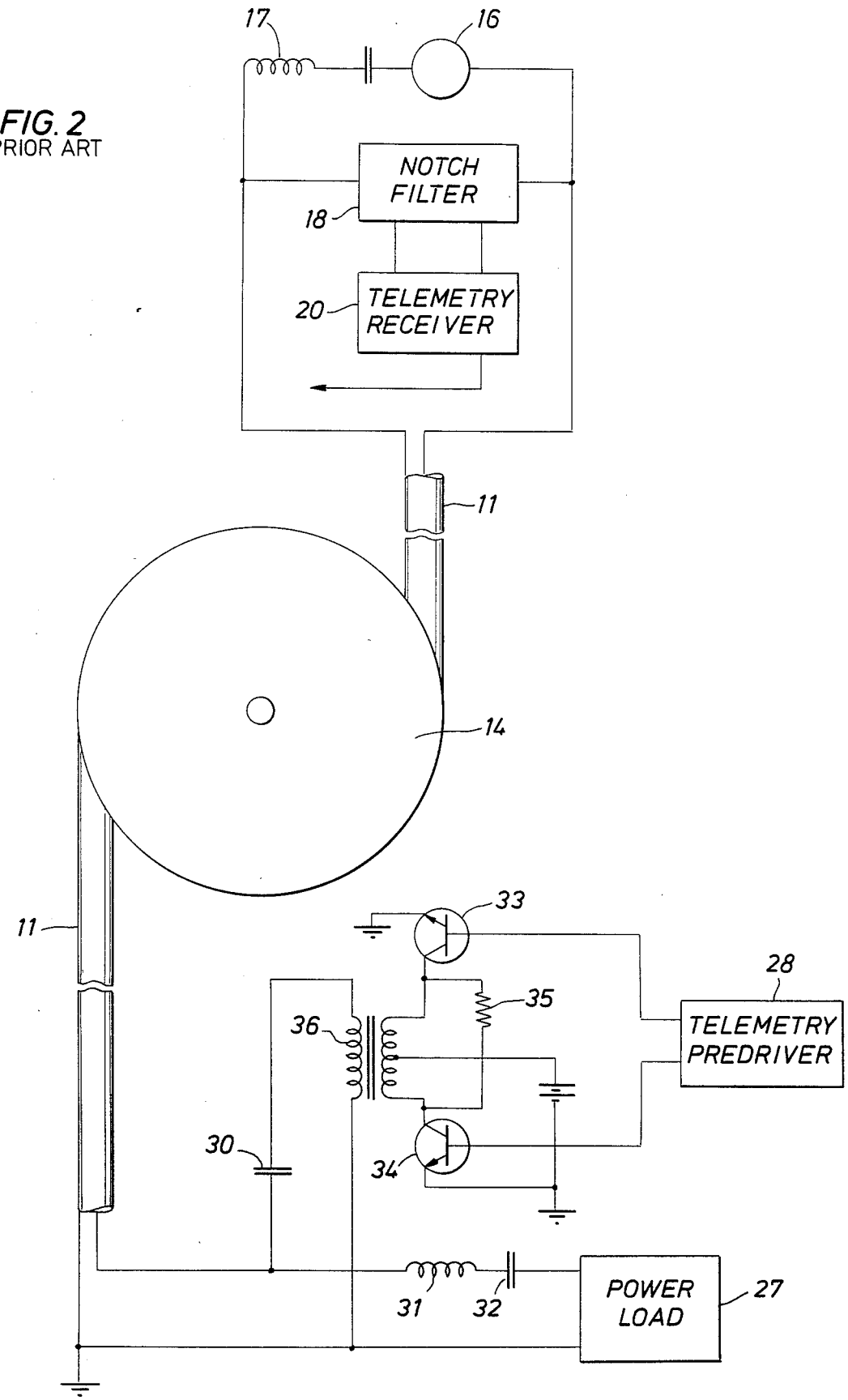
FIG. 2 is a partial schematic showing one telemetry driver circuit typifying the prior art.

Attention is directed to FIG. 2 of the drawings which was described partially in setting forth the problem that exists in this type of apparatus. As will be observed in FIG. 2, a power source 16 cooperates with a suitable LC filter 17 to form a suitable current which is imposed on the monocable 11. FIG. 2 further discloses a notch filter serving as the power source blocking filter 18. It is connected with a telemetry receiver 20 as in the same fashion as FIG. 1. The supply spool or reel 14 supports the monocable 11 in sufficient lengths to enable its operation in a deep well. As previously mentioned, FIG. 2 further cooperates with the power load 27 shown in FIG. 1 to enable this apparatus to operate. FIG. 2 further discloses a telmetry predriver 28 which forms the pulsed signal supplied to the driver stage shown in FIG. 2 for transmission of the telemetry data along the monocable.

Certain of the deficiencies of the circuitry shown in FIG. 2 were mentioned above. Briefly, this circuitry is typical of the coupling system now used and is therefore able to operate but with limitations as noted above.

Attention is directed to FIG. 3 which illustrates in detail a driver circuit 40. This is the output stage of the telemetry transmitter 25 shown in FIG. 1. This stage incorporates an analog multiplexer 41. It has a logic level pulse input at 42. The multiplexer 41 further includes input voltage levels through various input resistors. The resistors are identified at 43, 44, 45 and 46. The multiplexer forms an output an conductors which are connected through capacitors to supply levels. One output conductor is 47 and the other output conductor is 48. They are under control of the logic level pulse 42. The conductor 47 is connected to a capacitor 49 to a positive bias level which is 15 volts. The conductor 48 is connected through a capacitor 50 to a negative bias such as minus 15 volts. The two conductors are input to a set of Schmitt triggers which operate as a buffer, the Schmitt trigger buffer being indicated at 51.

The conductor 47 (after passing through the buffer) is input to an FET transistor 53. In like fashion, the conductor 48 is input to an FET transistor 54. The two transistors are provided with power for operation from a plus 15 volt supply through a supply resistor 55 and a minus 15 volt supply through a resistor 56. Suitable capacitors to ground at 57 and 58 shunt excessively high frequency signal components and help provide the high curents required to drive the output pulses.

FIG. 3 further shows a second analog multiplexer which is similar to the first. The numeral 61 identifies the second multiplexer. It is connected in the same fashion as the multiplexer 41, and operates with a similar Schmitt trigger buffer. The second analog multiplexer 61 is input to the FET transistors 63 and 64 shown in FIG. 3 again utilizing a Schmitt trigger buffer. The multiplexers 41 and 61 receive the logic level pulses and cause the FET transistors to switch to produce the desired output level (either positive pulse, negative pulse or low impedance, outputs).

The FET output stage includes a transformer 65 coupled across the FET transistor output stage. The primary of the transformer 65 forms the output signal in the secondary which is output through a coupling capacitor 66. The output signal is thus obtained through the transformer 65.

Assume for purposes of discussion that the quiescent state has been established. In this state, the transistors 54 and 64 are both conductive. When conductive, they provide a relatively low impedance. Assume that the multiplexer 41 is provided with a pulsed signal in the form of a microsecond length pulse to be coupled through the monocable 11. The resistors 43 and 45 are sized to control the rate at which the capacitors 49 and 50 accomplish charging. It is desirable that the capacitor 50 reach its charge level of minus 15 volts before the capacitor 49 reaches 15 volts. If the capacitor 50 completes charging first, or nearly so, transistor switching will occur. It is not essential that full charging be accomplished at either 49 or 50 because the interposed Schmitt trigger buffer 51 responds, thereby squaring off the exponentially increasing input signal. The capacitors 49 and 50 are thus charged, and as they approach the trigger level(s) set for the Schmitt trigger buffer 51, suitable pulses are formed for both transistors 53 and 54. They are, however, driven in a sequence dependent on the size of the resistors 43–46 and the relative recharge accumulated on the capacitors 49 and 50.

The output(s) from the Schmitt trigger buffer 51 are thus accomplished but not simultaneously. Thus, when the signal swings high the transistor 54 is cut off before the transistor 53 is cut on. Conversely, when the logic level goes low, the transistor 53 is turned off before the transistor 54 is turned on. This prevents series transistors 53 and 54 from conducting simultaneously. This enables the two transistors to jointly control the signal across the transformer 65. The opposite analog multiplexer 61 is arranged to provide similar switching action for the provision of an output pulse of opposite polarity. Through this driving arrangement, the pulse to be transmitted on the monocable is thus coupled through the transformer 65 and the coupling capacitor 66 into the monocable. One advantage of this operation is that the long duration pulses may be transmitted through the capacitor 66 (due to lower impedance quiescent state, a larger capacitor may be used). Moreover, reduced power consumption occurs in the output stage. Temperature stability is less of a problem in this circuit. Thermal runaway is thereby markedly reduced.

The foregoing sets forth an output driver stage for use in a monocable telemetry driver circuit. The output is coupled through the transformer 65 into the monocable to enable data transmission to the surface. AC power input through the monocable into the transformer 65 is held to a minimum as a result of the low impedance condition achieved by the FET transistors connected to the transformer 65 looking from the secondary back through the primary of that transformer.

While the foregoing is directed to the preferred and illustrated embodiment, the scope thereof is determined by the claims which follow.

What is claimed is:

1. For use in a telemetry system connected with a cable adapted to extend along a well borehole to a sonde supported on a monocable wherein the cable has two conductors and the cable conductors also carry AC power for operation of the power consuming equipment, a telemetry driver circuit which comprises:
   (a) a pair of serially connected FET driver transistors connected between two voltage levels providing current flow to said serially arranged transistors;
   (b) an input for each of said transistors;
   (c) a telemetry data input means for receiving data to be converted into telemetry pulses to be transmitted along said monocable, said means further including first and second channels adapted to be driven to logic levels as defined by the logic system of said means and wherein said means forms positive and negative output pulses;
   (d) connection means extending from said telemetry data input means to said inputs of said driver transistors for providing logic levels thereto for operation of said transistors wherein that operation is characterized by switching off one of said driver transistors before the other of said driver transistors is switched on;
   (e) said telemetry data input means including first and second circuits similar to one another for driving first and second logic levels at different rates to final logic levels;
   (f) said telemetry data input means further including RC circuit means controlling the time rate of charging toward final voltage value, and
   (g) capacitor coupled bias voltage sources input to Schmitt trigger means.

2. The apparatus of claim 1 wherein said driver transistors have a common connected point therebetween, that point being an output terminal for the pulses from said driver transistors, and said terminal is adapted to be connected to said monocable.

3. The apparatus of claim 1 wherein said Schmitt trigger means is connected to said driver transistors.

4. The apparatus of claim 3 including two similar transistor inputs and two similar Schmitt trigger means for said transistor inputs.

5. In a down hole logging system having a sonde supported on a monocable and wherein the monocable is adapted to transmit AC power from a power generating means at the surface to the sonde for consumption therein and wherein the monocable is additionally adapted to transmit telemetry data from the sonde along the same monocable toward the surface and the data is the form of serial pulses at a specified high frequency, a telemetry driving circuit which comprises
   (a) a pair of FET transistors connected together at similar terminals and having said similar terminals connected to a supply voltage level for operation of said transistors;
   (b) transformer means connected across output terminals of said transistors, said transformer means to being adapted to be driven by said transistors and having a secondary wherein the primary of said transformer means couples an output signal through the secondary of said transformer means for connection with the monocable;
   (c) each of said transistors having an input terminal adapted to receive an input level to initiate switching of said transistors;
   (d) multiplexer means receiving an input pulse and having two logic levels at two outputs, one output forming a specified logic level and the other output forming the other logic level and wherein the two outputs are connected to the input terminals of said transistors so that one of said transistors is switched conductive while the other of said transistors is switched non-conductive, and wherein said transistors each couple voltage pulses on becoming conductive to said transformer means.

6. The apparatus of claim 5 wherein said transistors are connected at their output terminals to loads therefor.

7. The apparatus of claim 6 wherein said loads are separate FET transistors.

8. The apparatus of claim 5 wherein said transformer connects with the monocable through a capacitor to vary coupling into the monocable as a function of frequency.

9. The apparatus of claim 5 including separate, series connected FET transistors for said FET transistors functioning as loads therefor, said FET transistor loads including input terminals therefor, and circuit means connected to said input terminals to provide synchronized multiplexed driving signals to said input terminals.

* * * * *